United States Patent [19]

Armstrong et al.

[11] 3,998,979

[45] Dec. 21, 1976

[54] PHOTOCURABLE PIGMENTED COATING COMPOSITIONS

[75] Inventors: Colin Armstrong, West Kingsdown; Peter Francis Nicks, Maidenhead; Derek John Walbridge, Beaconsfield, all of England

[73] Assignee: Imperial Chemical Industries Limited, London, England

[22] Filed: Nov. 4, 1975

[21] Appl. No.: 628,763

Related U.S. Application Data

[63] Continuation-in-part of Ser. No. 403,565, Oct. 4, 1973, abandoned.

[30] Foreign Application Priority Data

Oct. 9, 1972 United Kingdom ............ 46408/72

[52] U.S. Cl. .......................... 427/54; 204/159.14; 204/159.18; 204/159.19; 204/159.2; 204/159.23; 260/22 CB; 260/22 R; 260/22 CQ; 260/23 P; 260/40 R; 260/42.32; 427/53; 428/430; 428/481; 428/537

[51] Int. Cl.² .................. C08G 18/00; C08G 63/00

[58] Field of Search ................ 204/159.18, 159.19, 204/159.23, 159.24, 159.14; 96/115 P; 427/53, 54; 260/22 CQ, 22 R, 23 CB, 23 P

[56] References Cited

UNITED STATES PATENTS

| | | | |
|---|---|---|---|
| 3,650,669 | 3/1972 | Osborn et al. | 8/115.5 |
| 3,673,140 | 6/1972 | Ackerman et al. | 260/22 TN |
| 3,876,432 | 4/1975 | Carlick et al. | 96/115 P |

*Primary Examiner*—Richard B. Turer
*Attorney, Agent, or Firm*—Cushman, Darby & Cushman

[57] ABSTRACT

Pigmented coating compositions cureable in visible light which comprise as film former an unsaturated oil-modified alkyd resin, a polyurethane oil, polybutadiene or allyl ether-containing unsaturated polyester and a photosensitizer of structure

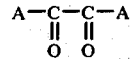

wherein A is benzenoid or heterocyclic of benzenoid character.

4 Claims, No Drawings

PHOTOCURABLE PIGMENTED COATING COMPOSITIONS

CROSS-REFERENCE TO RELATED APPLICATION

This application is a continuation-in-part of Ser. No. 403,565 filed Oct. 4, 1973, now abandoned.

BACKGROUND OF THE INVENTION

This invention relates to pigmented coating compositions, notably paints, which are based on polymers curable by an autoxidative process under the influence of visible or ultra-violet light.

It is well-known that certain polymers, in particular oil-modified alkyd resins, have the property of curing, i.e. crosslinking, in the presence of oxygen by an autoxidative polymerisation process. In the formulation of useful air-drying paint compositions incorporating such resins, it is common practice to include catalytic compounds which accelerate the autoxidation process, for example, metallic driers such as cobalt naphthenate or lead naphthenate. In the absence of such catalysts, the curing of the resin is normally a very slow process of no commercial significance.

However, the use of metallic driers may be undesirable in certain circumstances since, for example, they provide an unsatisfactory rate of drying at low ambient temperatures; they encourage the formation of a skin in a partially filled can of paint; and metals such as lead are toxic.

DESCRIPTION OF THE INVENTION

We have now found that paints can be formulated without the above mentioned disadvantages by using the surprising and unpredictable discovery that polymers which are crosslinkable by an autoxidative mechanism can be satisfactorily cured in visible light in the presence of pigments only when in the presence of a very restricted group of photosensitisers.

According to the present invention, we provide a pigmented coating composition suitable for use in visible light which comprises a polymer capable of autoxidative polymerisation in the presence of oxygen selected from the group consisting of unsaturated oil-modified alkyd resins, polyurethane oils, polybutadienes and allyl ether-containing unsaturated polyesters, and 0.05–5% by weight based on the polymer of a photosensitiser having the structure

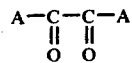

wherein the groups A are the same and selected from the group consisting of benzenoid aromatic groups and groups having a benzenoid character.

Suitable benzenoid aromatic groups include phenyl and naphthyl groups and their substituted derivatives, for example those containing halogen, alkyl or alkoxy substituents.

Suitable groups possessing benzenoid characteristics are furyl and thenyl groups.

Thus, suitable photosensitisers include, for example, benzil, anisil, 1-naphthil, 2-naphthil, o-tolil, thenil and furil.

The characteristic of the photosensitiser is that it is capable of absorbing incident actinic radiation and thereby of being converted to an excited state. By actinic radiation we mean either visible or ultra-violet light, generally having a wavelength within the range of 300–600 nm.

The photosensitiser may be present in the composition of the invention in a range of concentrations, depending upon the rate of cure that is desired, but in general a concentration of from 0.05 – 5%, preferably from 0.1 – 2%, based on the weight of the polymer is satisfactory.

The unsaturated oil-modified alkyd resins incorporate in their structure unsaturated fatty acid moieties derived from oils such as linseed oil, tung oil, tall oil, dehydrated castor oil and soya bean oil which are capable of drying by a crosslinking mechanism involving atmospheric oxidation. The alkyd resin may be of either of the classes commonly known as "long oil" or "short oil" respectively. If desired, a mixture of two or more different unsaturated oil-modified alkyd resins may be employed, or a mixture of such an alkyd resin or resins with another polymer, for example, a polyamide capable of imparting a thixotropic character to the composition, a polyurethane or a vinyl polymer.

A wide range of polyurethane oils, polybutadienes and allyl ether/unsaturated polyesters may be used.

One advantage of the compositions of the present invention is that the rate of autoxidative crosslinking of the polymer is substantially independent of the ambient temperature. Thus, for example, the ambient temperature may be as low as 0° C. without any substantial decrease in the drying rate of a coating film, provided that there is an appropriate level of actinic radiation. On the other hand the rate of drying of a film containing conventional metal driers is markedly decreased at low ambient temperatures.

The photosensitiser should desirably be soluble in or compatible with the alkyd resin in the amounts required, if necessary in the presence of a suitable solvent or mixture of solvents.

Whilst it was known that a wide range of photosensitisers could be used in formulating photopolymerisable compositions, notably those which contain polymerisable monomers, it was believed by those skilled in the art that the presence of pigments, such as titanium dioxide, which absorb actinic light, would prevent the absorption of actinic light by the photosensitiser. It was surprising, therefore, in the case of autoxidisable polymers, which are used together with pigments in the formulation of paints, that there was found a very restricted class of photosensitisers which provided a satisfactory rate of drying comparable to that of conventional metallic driers. Compositions to which the invention is particularly applicable are those in which the pigment comprises titanium dioxide but other pigments may also be present for example azo pigments; iron oxides; carbon black; phthalocyanine pigments; and metallic pigments.

The compositions of the invention may contain, in addition to the constituents already mentioned, other additives which are conventional in the coatings art.

According to another aspect of the invention, we provide a process for producing a coating upon a substrate which comprises applying to the substrate a pigmented composition as hereinbefore defined and exposing the composition to actinic radiation having a wave length within the range 300–600nm.

Compositions according to the invention cure on exposure to sunlight in periods of from 1 to 10 hours depending upon the concentration of photosensitiser which is present and on the intensity of the incident radiation; a typical sunlight intensity is in the range 8 – 10 units as measured with a Weston Master Five light meter held at a distance of 1 inch above the film. In general, the rate of cure is closely comparable with the drying rate of conventional oil-modified alkyd-based paints containing metallic driers. On the other hand, when stored in the dark the compositions are indefinitely stable and show little or no tendency to "skin" in the can, in contrast to conventional paints which have only a limited storage life, even in the dark, unless antiskinning agents such as dipentene or methyl ethyl ketoxime are added. The absence of metallic driers from the compositions of the invention confers the additional advantages of freedom from the toxic hazards associated with metals, especially lead, and freedom from discoloration tendencies on ageing. Similar pigmented compositions which contain photosensitisers not of the restricted group of this invention are incompletely cured even after 24 hours exposure to sunlight.

Although the curing of the compositions of the invention by visible light is not influenced by the presence of conventional metallic driers, such materials may be incorporated in the compositions in order to achieve special effects. For example, incorporation of cobalt naphthenate affords a non-toxic composition which, in addition to having the property of curing fully under the influence of actinic radiation, also possesses the ability to undergo surface drying in the dark. Such a composition could be applied as an exterior finish under conditions of poor natural illumination to give a coating rapidly becoming tack-free, the "through" cure of the film being completed subsequently when the illumination returns to a normal level.

The invention is illustrated but not limited by the following Examples, in which parts are by weight.

EXAMPLE 1

A full gloss white paint was prepared in the following manner. A pigment millbase was made by dispersing 1,753g of rutile titanium dioxide in 409g of a 75% solution of a long oil length soya bean oil alkyd and 288g of white spirit. The alkyd contained 68% fatty acids, 20% phthalic anhydride and pentaerythritol as polyol. It had an acid value of 11mg KOH/g and a viscosity of 10 – 15 poises at 20° C. when used as a 75% solids solution in white spirit.

A further 2,172g of the alkyd were added to the millbase and thoroughly mixed.

To 100g of this paint was added 0.42g of benzil dissolved in 0.9g of acetone.

To a similar quantity of paint were added 0.20g of cobalt naphthenate (6% cobalt), 3.4g of lead naphthenate (24% lead) and 2.1g of calcium naphthenate (4% calcium).

The paints were then thinned to a viscosity of 4 poises at 10,000 secs$^{-1}$ at 28° C. 0.002 inch thick films of these paints were spread on glass panels and allowed to dry in diffuse sunlight. Both were tack free in 4 hours and through-dry in 8 hours.

A film of the same paint containing no additives was still tacky after 24 hours exposure.

EXAMPLE 2

A full gloss white paint was prepared using the method described in Example 1, except that a medium oil length linseed oil alkyd was used as the resin. The alkyd contained 53% linseed oil fatty acids 33% phthalic anhydride and glycerol as the polyol. The resin had an acid value of 9mg/KOH/g and a viscosity of 5 – 8 poises when measured at 20° C. as a 50% solids solution in white spirit.

374g of rutile titanium dioxide was dispersed in 140g of the alkyd and 85g of white spirit. A further 666g of alkyd solution were added to the millbase.

To 100g of paint so prepared was added 0.32g of benzil dissolved in 0.6g of acetone.

To a further 100g of paint as above were added 0.2g of cobalt naphthenate (0.04% cobalt) and 2.4g of lead naphthenate (1.8% lead). The paints were thinned to a viscosity of 4 poises at 10,000 secs$^{-1}$ at 25° C.

Films of the two paints were spread on glass and allowed to dry in diffuse sunlight. Both films were hard dry in 6 hours.

EXAMPLE 3

A white full gloss paint was prepared in the manner described in Example 1 except that a vinyl toluenated alkyd was used as the resin. This alkyd was a 28% vinyl toluenated linseed dehydrated castor oil alkyd containing 44% fatty acids, 23% phthalic anhydride and glycerol as the polyol. It had an acid value of 8 mg KOH/g and a viscosity of 8 – 12 poises when measured as 60% solids solution in white spirit. 962g of rutile titanium dioxide were dispersed in 273g of the alkyd and 152g of white spirit. A further 1,454g of alkyd were added to the millbase.

To 100g of this paint were added 0.33g benzil dissolved in 0.6g of acetone.

To a further 100g was added 0.3g of cobalt naphthenate (6% cobalt).

The paints were thinned to a viscosity of 4 poise at 10,000 secs$^{-1}$ at 25° C.

0.002 inch thick films of these paints and of a sample of the paint containing no additives were spread on glass and allowed to dry in diffuse sunlight. All films were touch dry in 1 hour and hard dry in 4 hours. The film which did not contain either of the additives was, however, readily redissolved in white spirit after this time whereas those containing the additives were not soluble in white spirit.

EXAMPLE 4

The following six photosensitisers were added respectively to six 100g samples of the paint prepared in Example 1 to give a concentration of 11% by weight of sensitiser based on the total solids weight of the paint: (a) furil, (b) benzil, (c) o-tolil, (d) anisil, (e) 1-naphthil and (f) thenil.

The paint samples were spread as films about 0.002 inch thick on glass and the drying rates of the films in diffuse sunlight were compared with that of a film of the paint containing conventional driers i.e. 0.1% cobalt as metal and 1.0% lead as metal both present as the naphthenates. All of the films (a) – (f) dried at a rate comparable to that of the conventionally dried paint.

EXAMPLE 5

This Example illustrates the advantage of the restricted class of photosensitisers used in the autoxidative compositions of the present invention when compared with typical representatives of the wide range of other photosensitisers which are commercially available.

A full gloss white paint was prepared according to Example 1. The following photosensitisers were added respectively to five samples of the paint in an amount of 1% weight based on the total solids weight of the paint,

| | |
|---|---|
| (a) acetophenone | (b) benzoinmethylether |
| (c) benzophenone | (d) Michlers ketone/benzophenone (in a weight ratio of 1:8) |
| (e) benzil. | |

Part of each sample was applied as a strip of film approximately 0.002 inch thick and ½ inch wide on a non-porous substrate and the films exposed in sunlight and facing north in a laboratory. The intensity of the light was 10.5 units as measured with a Weston V light meter held 1 inch above the films. The drying time of each film was measured using a sand track machine in which sand is progressively deposited along the length of a drying strip of film at a suitable rate relative to the expected time for the film to become tack-free. Sand no longer adheres to the film when it becomes tack-free.

It was found that the paint containing benzil was tack-free in about 7 hours whereas the paints containing the other photosensitisers were still tacky after 12 hours the maximum time of operation of the machine. Films of the paints described above were also applied as 0.004 inch spreads on glass and the drying characteristics assessed by touch in sunlight under the same conditions as above whereas the benzil containing paint was through dried after 7 hours, those containing the other sensitisers were soft and tacky after 24 hours.

EXAMPLE 6

White gloss paints were prepared by the method generally described in Example 1 but using short oil length linseed and dehydrated castor oil (DCO) alkyds respectively as the resins. These alkyds contained 40–43% of the fatty acids, 40–45% phthalic anhydride and contained glycerol as the polyol. Each had an acid value of 30 – 40 mg KOH g and a viscosity of 70 – 80 poise at 25° C. when measured as a 50% solids in xylol. Both resins could be diluted to approximately 25% solids with white spirit. 481 g of rutile titanium dioxide were dispersed in 164g of the linseed alkyd and 76g of white spirit. A further 873g of the alkyd were added to the millbase.

A similar paint was prepared using the DCO alkyd in which 337g of rutile titanium dioxide were dispersed in 115g of the DCO alkyd and 53g of white spirit. A further 611g of the alkyd were added to the millbase.

To 100g samples of each of the paints were added 0.33g and 0.65g of benzil respectively. The paints were then thinned to a viscosity of 4 poises at 10,000 secs$^{-1}$ at 25° C. Films were spread of the catalysed paints and of paints containing no catalyst and were allowed to dry exposed to diffuse sunlight. All films became tack free within 1 hour and were hard dry within 4 hours. After 16 hours the films were rubbed with a cloth soaked in xylol. Those containing no catalyst were rubbed through after 4 – 5 rubs whereas those containing the catalyst required 30 – 40 rubs before the film was rubbed through.

EXAMPLE 7

A white full gloss paint was prepared by dispersing 163g of rutile titanium dioxide in 159g of a 75% solids solution of polybutadiene in white spirit and 46g of white spirit. The polybutadiene had a molecular weight of 1,500 and contained predominantly the cis-1:4 isomer.

After dispersion was complete a further 140g of the polymer solution was added to the millbase.

To 100g of the paint, 0.44g of benzil was added. To a further 100g of the paint was added 0.74g of cobalt naphthenate solution (6% cobalt).

The paints were then thinned to a viscosity of 4 poises at 10,000 secs$^{-1}$ and 25° C. Films were spread on glass and allowed to dry exposed to diffuse sunlight.

Both films dried within 8 hours to give tack free but soft films.

EXAMPLE 8

A full gloss white paint was prepared as described in Example 1. To one sample (a) of this paint was added 1% by weight of benzil based on the weight of resin and to another sample (b) of the paint was added 0.04% cobalt metal, 1.9% lead metal and 0.2% calcium metal by weight based on the weight of resin in the form of their napthenates.

Coatings were applied to "undercoated" wooden panels and exposed out of doors to bright winter sunlight. The incident light intensity was 12.5 units as measured with a Weston V Light meter held above the panel. The air temperature was 4° C.

An Assessment of the drying rate showed that the benzil-containing paint (a) was "tack-free" in 2 hours and hard dry in 4 hours, whereas paint (b) was "tack-free" in 4 hour and hard dry in 6 hours.

We claim:

1. A pigmented coating composition suitable for use in visible light which comprises an unsaturated oil-modified alkyd resin polymer capable of autoxidative polymerisation in the presence of oxygen and 0.05 – 5% by weight based on the combined weight of pigment and polymer of a photosensitiser selected from the group consisting of benzil, anisil, o-tolil, 1-naphthil, 2-naphthil, furil and thenil.

2. A pigmented coating composition according to claim 1 wherein there is present 0.1 – 2% by weight of photosensitiser based on the combined weight of pigment and polymer.

3. A pigmented coating composition according to claim 1 wherein the pigment comprises titanium dioxide.

4. A process for producing a coating upon a substrate which comprises applying to the substrate a pigmented composition according to claim 1 and exposing the composition to actinic radiation having a wavelength within the range 300 – 600nm.

* * * * *